(12) United States Patent
Woody et al.

(10) Patent No.: US 7,980,047 B1
(45) Date of Patent: Jul. 19, 2011

(54) APPARATUS FOR AND METHOD OF SEVERING AND SEALING THERMOPLASTIC FILM

(75) Inventors: Clark Woody, Pinconning, MI (US); P. Gregory Velez, Saginaw, MI (US); Jeffrey S. Hoffman, Linwood, MI (US); Stephen P. Gangler, Unionville, MI (US)

(73) Assignee: S.C. Johnson & Son, Inc., Racine, WI (US)

( * ) Notice: Subject to any disclaimer, the term of this patent is extended or adjusted under 35 U.S.C. 154(b) by 2362 days.

(21) Appl. No.: 09/614,898

(22) Filed: Jul. 12, 2000

(51) Int. Cl.
*B65B 51/22* (2006.01)

(52) U.S. Cl. ............... 53/479; 53/371.8; 53/374.8

(58) Field of Classification Search .............. 53/479, 53/371.8, 374.8, 370.7, 373.7
See application file for complete search history.

(56) References Cited

U.S. PATENT DOCUMENTS

| | | | |
|---|---|---|---|
| 2,737,859 A | 3/1956 | Allison et al. | 93/8 |
| 2,909,969 A | 10/1959 | Styers | 93/8 |
| 3,221,613 A | 12/1965 | Sanders | 93/8 |
| 4,016,806 A | 4/1977 | Schuster | 93/35 R |
| 4,023,470 A | 5/1977 | van der Meulen | 93/35 R |
| 4,048,003 A | 9/1977 | Bolli | 156/515 |
| 4,115,182 A * | 9/1978 | Wildmoser | 156/515 |
| 4,288,968 A * | 9/1981 | Seko et al. | 53/550 |
| 4,396,449 A | 8/1983 | Tumminia | |
| 4,735,675 A * | 4/1988 | Metz | 156/583.4 |
| 4,867,735 A | 9/1989 | Wogelius | 493/197 |
| 4,909,016 A | 3/1990 | Rentmeester et al. | 53/373 |
| 4,913,761 A | 4/1990 | Russell et al. | |
| 5,094,657 A * | 3/1992 | Dworak et al. | 156/323 |
| 5,179,819 A * | 1/1993 | Sukeyasu et al. | 53/386.1 |
| 5,412,927 A * | 5/1995 | Miyazaki et al. | 53/552 |
| 5,546,732 A * | 8/1996 | Coleman et al. | 53/238 |
| 5,689,937 A * | 11/1997 | Gorlich et al. | 53/433 |
| 5,718,101 A * | 2/1998 | Noel et al. | 53/300 |
| 5,839,572 A * | 11/1998 | Yeager | 206/204 |
| 5,894,709 A | 4/1999 | Fosshage | 53/450 |
| 5,964,688 A | 10/1999 | Woody et al. | 493/207 |
| 6,260,336 B1 * | 7/2001 | Motomura | 53/551 |
| 6,305,149 B1 * | 10/2001 | Gorlich et al. | 53/329.5 |
| 6,631,605 B1 * | 10/2003 | Quintin et al. | 53/451 |
| 6,694,712 B2 | 2/2004 | Suolahti | 53/588 |

FOREIGN PATENT DOCUMENTS

| | | |
|---|---|---|
| DE | 1083174 | 6/1960 |
| GB | 970753 | 9/1964 |
| GB | 1264568 | 2/1972 |
| GB | 1438628 | 6/1976 |

OTHER PUBLICATIONS

International Search Report in Int'l Appln. No. PCT/US01/21830.

* cited by examiner

*Primary Examiner* — Sameh H. Tawfik
*Assistant Examiner* — Gloria R Weeks

(57) ABSTRACT

A method of severing and sealing a film formed of a thermoplastic material includes heating a cutting edge implement to a temperature sufficient to melt but not to burn the thermoplastic material, feeding a plurality of layers of the film between the cutting edge implement and an opposing surface, and moving the cutting edge implement, which is preferably a supported hot wire, and the opposing surface relative to one another to pinch the plurality of layers of film therebetween. Thereafter, any relative lateral movement between the cutting edge implement, the film, and the opposing surface is suspended, while the cutting edge implement and the opposing surface are relatively biased together with the plurality of layers of film pinched therebetween, until the cutting edge implement cuts through the plurality of layers of film, contacts the opposing surface, and seals the plurality of layers of film together.

11 Claims, 6 Drawing Sheets

—PRIOR ART—

—PRIOR ART—

APPARATUS FOR AND METHOD OF SEVERING AND SEALING THERMOPLASTIC FILM

BACKGROUND OF THE INVENTION

1. Field of the Invention

The present invention relates generally to an apparatus for and a method of severing and sealing thermoplastic film to make plastic bags or the like, and in particular to an apparatus and a method that utilize a combination of thermal energy and mechanical force to sever and seal the thermoplastic film.

2. Description of the Related Art

In the production of plastic bags, a continuous web of thermoplastic film typically is supplied to a bag-making machine that severs the film into segments and seals the severed edges of each segment to form a bag.

Referring to FIG. 1, a known bag-making machine is designated generally by reference numeral 10. The machine shown is a dual-lane bag-making machine. That is, two folded webs of thermoplastic film 22 are fed to the machine 10 in parallel, and the machine 10 severs and seals the parallel webs to form two sets of bags.

The bag-making machine 10 includes a continuously rotating seal drum 12 and a cam track assembly 14. Folded webs of thermoplastic film 22 are fed between the seal drum 12 and the cam track assembly 14. A plurality of clamping devices 16, such as disclosed in U.S. Pat. No. 5,964,688, assigned to the same assignee as the present invention and incorporated herein by reference in its entirety, is mounted on the cam track assembly 14 for movement therearound. As best seen in FIG. 2, each clamping device 16 comprises a pair of parallel spring-mounted seal bars 18, separated by a gap 20.

The clamping devices 16 intermittently contact the film 22 and clamp it firmly against the seal drum 12. A cam-actuated, electrically-heated hot wire 24 advances through an opening 26 in the surface of the seal drum 12, burns its way through the film 22, and moves into the gap 20 between the seal bars 18. In this way, the film 22 is severed into segments and the resulting severed edges are simultaneously sealed.

As shown in FIG. 3, a typical hot wire 24 consists of a relatively thin, elongated piece of electrically-conductive material stretched between supports 28 disposed on opposite sides of the effective cutting lengths 30 of the hot wire 24. To date, hot wires of various sizes and shapes have been used. For instance, some processes have employed hot wires having circular cross sections with diameters up to about 0.050 inches. Other processes have employed rectangular or wedge-shaped hot wires. Such conventional hot wires generally are heated to temperatures between 1000-1400° F.

Several problems exist in the production of plastic bags using conventional bag-making machines such as that described above. For example, as the hot wire burns its way through the film, a significant amount of smoke is produced. Some of this smoke condenses on components of the machine, leaving behind a wax residue. On an almost daily basis, the machine must be shut down and the components cleaned in order to remove the wax buildup. Another problem with conventional bag-making machines is that the relatively thin, high-temperature hot wires often fail due to the stress of repeated severing and sealing operations. Replacing broken wires requires additional downtime for the machine and results in a further reduction in productivity.

Accordingly, there is a need in the art for an improved apparatus for and method of severing and sealing thermoplastic film to form plastic bags or the like.

There is a further need for such an apparatus and method that reduce the amount of wax that accumulates on the components of the apparatus.

There is a still further need for such an apparatus and method wherein the hot wire used to sever and seal the film will not easily break when subjected to repeated severing and sealing operations.

SUMMARY OF THE INVENTION

The present invention addresses the foregoing needs in the art by providing an apparatus for and a method of severing and sealing thermoplastic film that utilizes a cutting edge implement heated to a lower temperature than hot wires utilized in conventional bag-making machines, and that applies a combination of thermal energy and mechanical force to sever and seal the film.

In a first aspect of the present invention, a method of severing and sealing a film formed of a thermoplastic material includes heating a cutting edge implement to a temperature sufficient to melt but not to burn the thermoplastic material, feeding a plurality of layers of the film between the cutting edge implement and an opposing surface, and moving the cutting edge implement and the opposing surface relative to one another to pinch the plurality of layers of film therebetween. Thereafter, any relative lateral movement between the cutting edge implement, the film, and the opposing surface is suspended, while the cutting edge implement and the opposing surface are relatively biased together with the plurality of layers of film pinched therebetween, until the cutting edge implement cuts through the plurality of layers of film, contacts the opposing surface, and seals the plurality of layers of film together.

In another aspect, a method of severing and sealing a film includes clamping the film between opposing surfaces, heating a cutting edge implement to a temperature sufficient to melt but not to burn the film, and moving the cutting edge implement past one of the opposing surfaces toward the other surface so that the cutting edge implement presses against the film toward the other surface for a period of time sufficient to sever the film and seal the resulting severed edges.

In still another aspect, an apparatus for severing and sealing a film formed of a thermoplastic material includes a cutting edge implement that is heatable to a temperature sufficient to melt but not to burn the thermoplastic material, an anvil, and means for feeding a plurality of layers of the film between the cutting edge implement and the anvil. The apparatus further includes means for moving the cutting edge implement and the anvil relative to one another to pinch the plurality of layers of film therebetween, and means for suspending any relative lateral movement between the cutting edge implement, the film, and the anvil, while pressing the cutting edge implement toward the anvil with the film pinched therebetween, until the cutting edge implement melts through the plurality of layers of film, contacts the anvil, and seals the plurality of layers of film together.

In a further aspect, a method of severing and sealing a film formed of a thermoplastic material includes pinching a plurality of layers of the film between a substrate and a cutting edge implement that is heated to a temperature sufficient to melt but not to burn the thermoplastic material, and pressing the cutting edge implement toward the substrate with the plurality of layers of film pinched therebetween, until the cutting edge implement melts through the plurality of layers of film, contacts the substrate, and seals the plurality of layers of film together.

In each of these aspects, it is preferred that the cutting edge implement be a hot wire. Preferably, the hot wire is supported along substantially its entire effective cutting length.

A better understanding of these and other objects, features, and advantages of the present invention may be had by reference to the drawings and to the accompanying description, in which there are illustrated and described preferred embodiments of the invention.

BRIEF DESCRIPTION OF THE DRAWINGS

Throughout the figures, like reference numerals have been used for like or corresponding parts.

DESCRIPTION OF THE PREFERRED EMBODIMENTS

For illustrative purposes, the severing and sealing apparatus and method of the present invention are described in connection with the production of plastic bags made from a folded web of polyethylene film (by way of example, but not limitation, either completely low density or a blend of low density and linear low density, depending on the desired bag parameters). In forming such bags, the film is typically folded such that it is closed along one edge and open along the other. Mating zipper elements (or other suitable closure mechanisms) are provided along the open edge. The closed (or folded) edge can further be folded inward to form a pleat. Thus, the web is four plies thick near the closed edge, and two plies thick near the open edge (plus the thickness of the zipper elements). The web is severed and sealed transversely to form the lateral edges of the bags.

The present invention also can be utilized in the production of bags made from other thermoplastic materials, such as polypropylene or the like, as well as in the production of bags from films of varying thicknesses, or from webs having different configurations (such as webs having fewer or more layers, webs incorporating zipper elements, slider closure mechanisms, drawstrings, etc.), or even from multiple webs stacked on top of one another (e.g., back-to-back bags) or nested within each other (e.g., a bag-in-a-bag).

The severing and sealing apparatus and method of the present invention represent improvements over the known bag-making machines and methods discussed above. The improvements include, among others, replacing the spaced seal bars with one-piece anvils, replacing the relatively thin, high-temperature hot wires with larger, lower-temperature cutting edge implements, and supporting the cutting edge implements for substantially their entire lengths.

Figure 1:
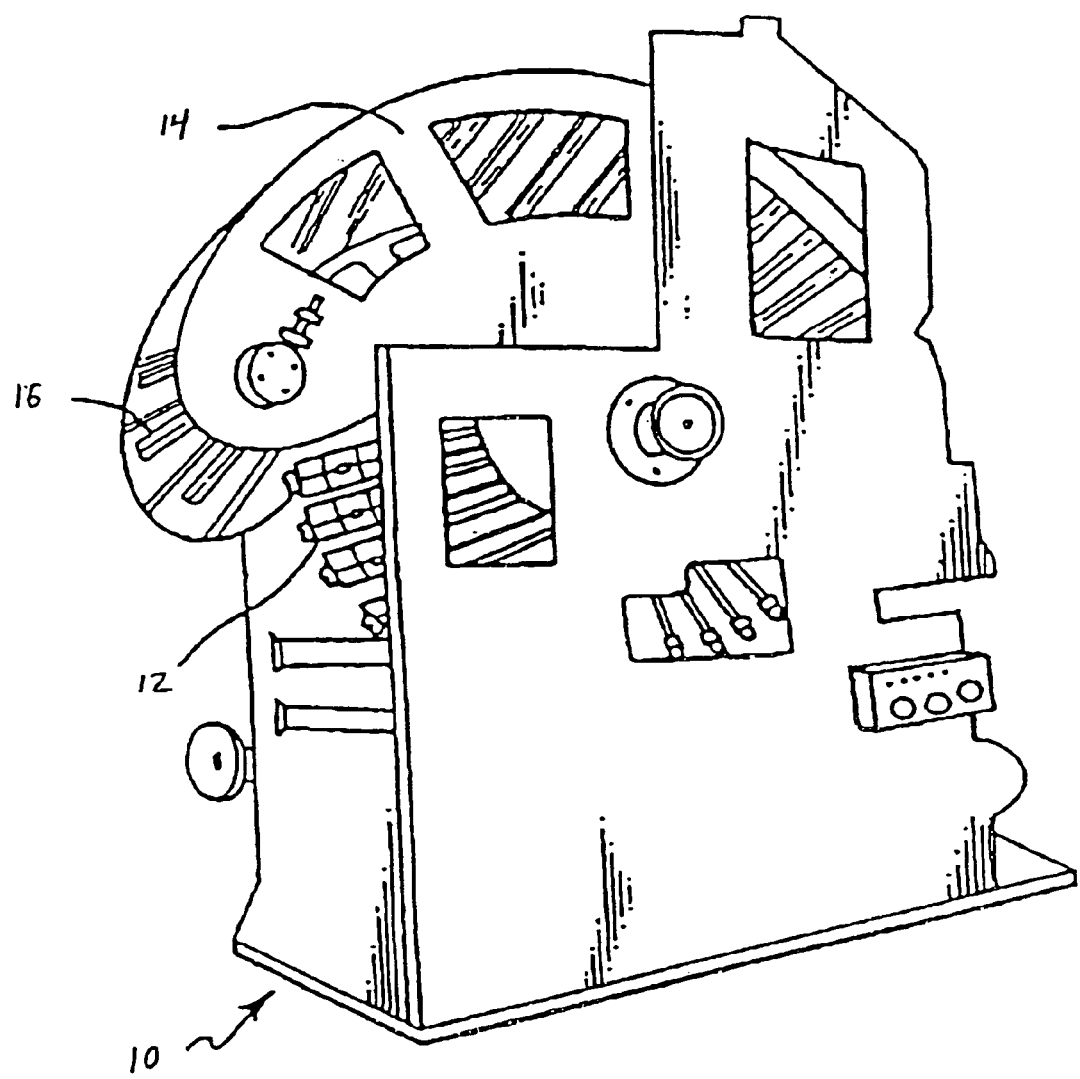
FIG. 1 is a perspective view of a conventional bag-making machine.
Figure 2:
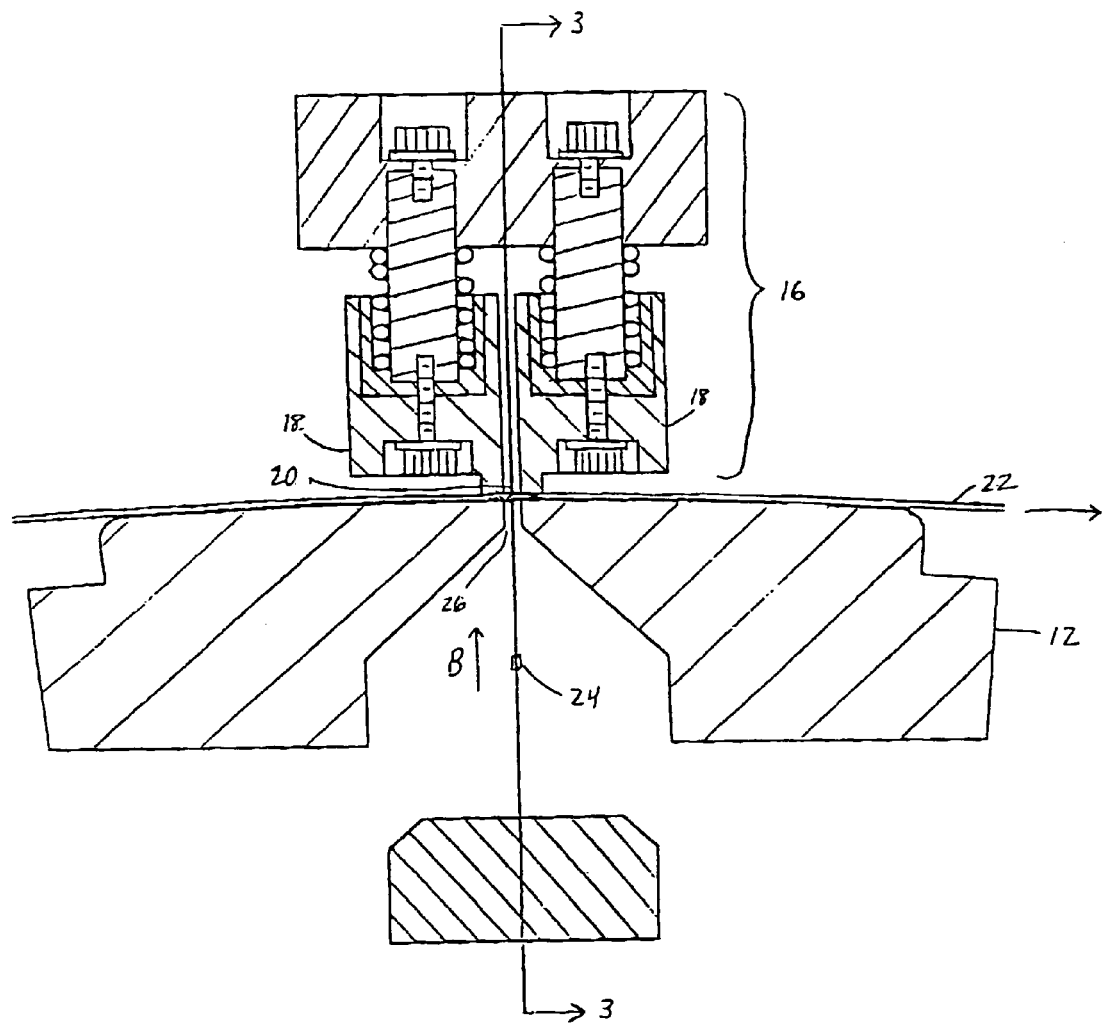
FIG. 2 is a cross-sectional view of a typical hot wire assembly and opposing clamping device utilized in the bag-making machine of FIG. 1.
Figure 3:
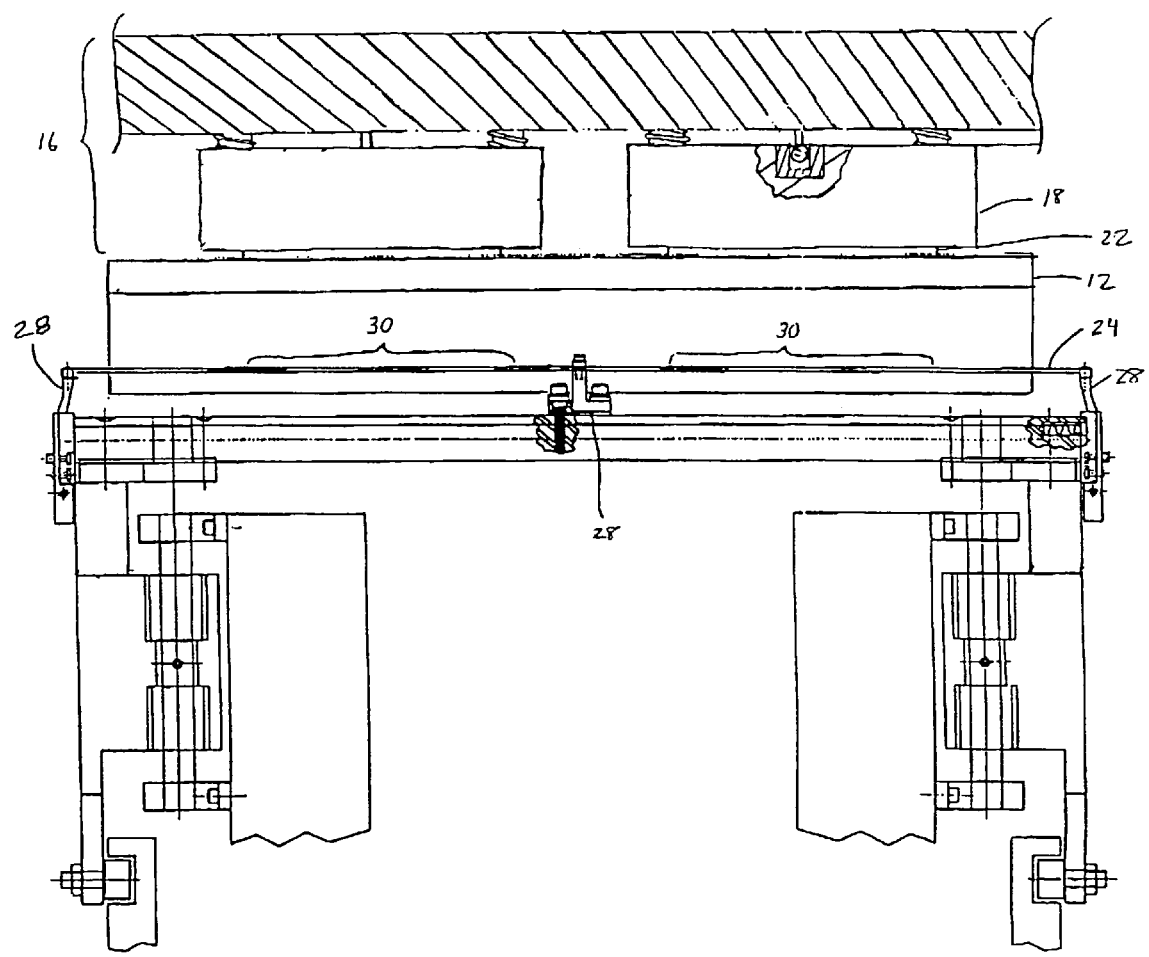
FIG. 3 is a cross-sectional view taken along cross section line 3-3 in FIG. 2.
Figure 4:
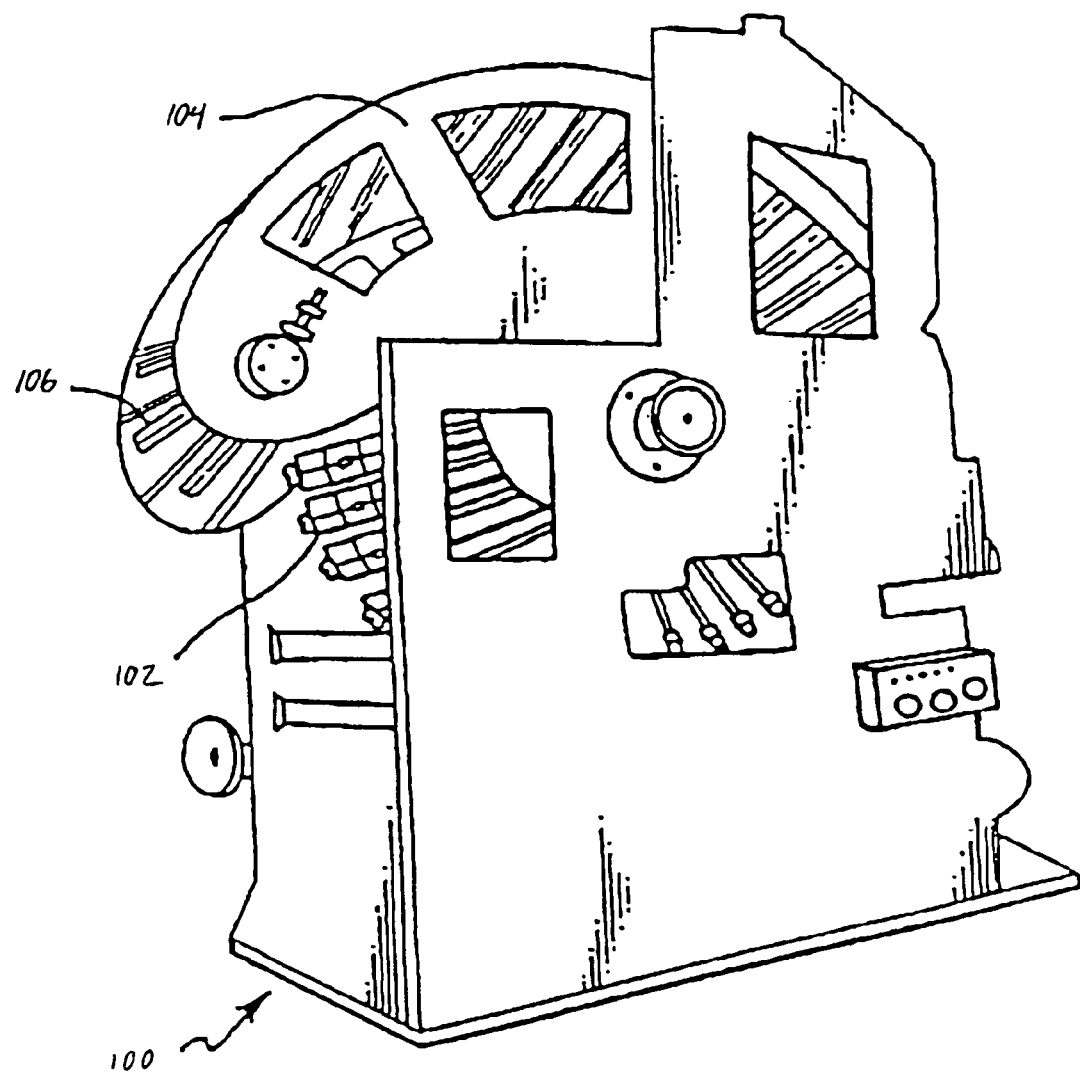
FIG. 4 is a perspective view of a severing and sealing apparatus according to a preferred embodiment of the present invention.

Referring to FIG. 4, a severing and sealing apparatus according to a preferred embodiment of the present invention is designated generally by reference numeral 100. The apparatus shown is a dual-lane severing and sealing apparatus. That is, two folded webs of polyethylene film are fed to the apparatus in parallel, and severing and sealing apparatus of the present invention readily can be adapted for use in a single-lane or other multiple-lane production line.

In a preferred embodiment, the severing and sealing apparatus 100 generally comprises a continuously rotating cylindrical seal drum 102 and a generally kidney-shaped cam track assembly 104, comprising a pair of opposing anvil cam tracks. The anvil cam tracks run parallel to the seal drum 102 for approximately one-third of the circumference of the seal drum 102. A plurality of anvil assemblies 106 is mounted at spaced intervals around the cam track assembly 104 for movement on the anvil cam tracks. The anvil assemblies 106 are interconnected by one or more chains (not shown) so that they can be commonly driven.

The anvil assemblies 106 move around the cam track assembly 104 at approximately the peripheral speed of the rotating seal drum 102. Preferably, the seal drum 102 and anvil assemblies 106 are commonly driven by a known motor and gear train (not shown). Any of a number of other known mechanisms can similarly be used to rotate the seal drum 102 and to move the anvil assemblies 106 around the cam track assembly 104. Alternatively, the seal drum 102 and anvil assemblies 106 can be driven by separate devices.

Figure 5:
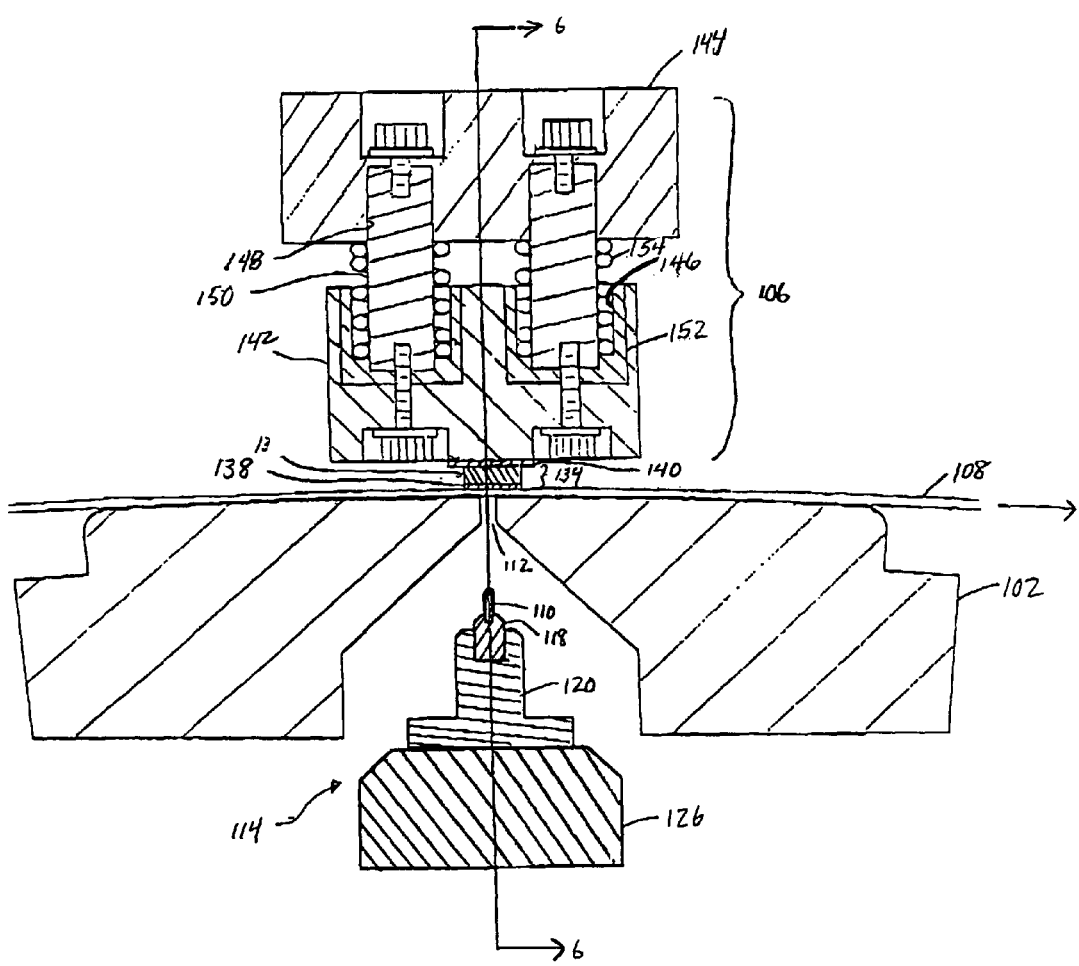
FIG. 5 is a cross-sectional view of a cutting assembly and opposing anvil assembly utilized in the severing and sealing apparatus of FIG. 4.

Referring to FIG. 5, continuous folded webs of polyethylene film 108 are fed between the seal drum 102 and the cam track assembly 104 of the severing and sealing apparatus 100 by known means, such as feed rollers (not shown) or the like. The seal drum 102 and anvil assemblies 106 together clamp the film 108 and advance it through the severing and sealing apparatus 100.

The seal drum 102 includes a plurality of cutting assemblies 114 reciprocally mounted at spaced intervals around the interior of the seal drum 102. The spacing between the cutting assemblies 114 and the spacing between the anvil assemblies 106 correspond, so that each cutting assembly 114 registers with a respective anvil assembly 106 for a distance as the seal drum 102 rotates and the anvil assemblies 106 move around the cam track assembly 104. Each cutting assembly 114 includes a reciprocally-mounted cutting edge implement, preferably an elongated hot wire 110, which is heated. The hot wire 110 is intermittently advanced through a respective opening 112 in the surface of the seal drum 102 to contact the film 108 and press it against an opposing anvil assembly 106. The film 108 remains pinched between the hot wire 110 and the anvil assembly 106 until the hot wire 110 melts through the layers of the film 108, contacts the anvil assembly 106, and seals the layers of the film 108 together.

Each hot wire 110 is held taut and is electrically coupled at either end, and is also preferably supported for substantially its entire length by an electrically- and thermally-insulating material. The hot wire 110 preferably has a larger cross section than conventional hot wires, and is maintained at a temperature that will melt, but not burn, the film 108.

Figure 6:
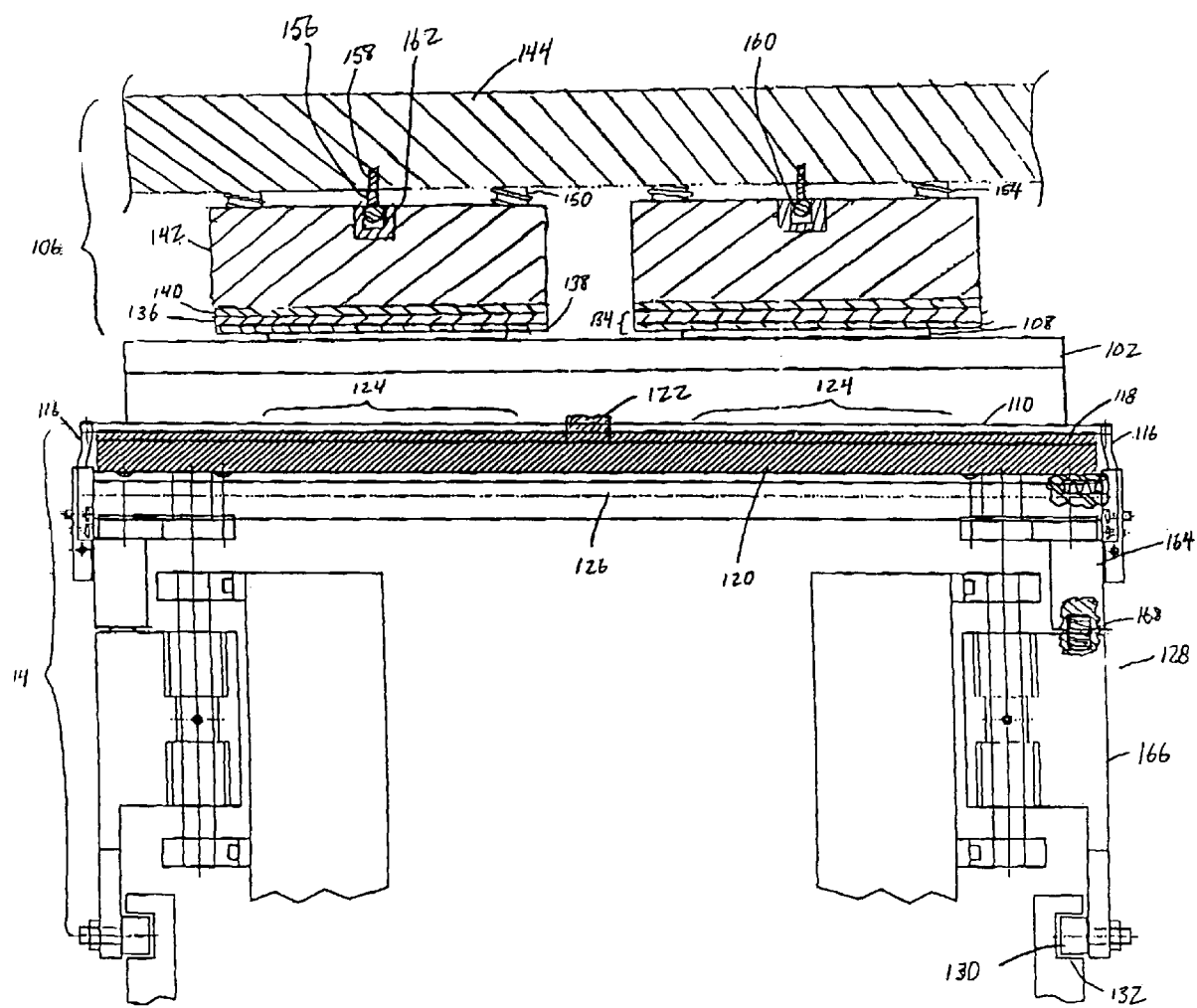
FIG. 6 is a cross-sectional view taken along cross section line 6-6 in FIG. 5.

The structure of a preferred cutting assembly 114 is explained below with reference to FIGS. 5 and 6. The hot wire 110 is coupled at each end to an end-clip finger 116 by a screw or the like. The hot wire 110 and the end-clip fingers 116 preferably are constructed of electrically-conductive materials. Most preferably, the hot wire 110 is made of a high-nickel content alloy, such as Inconel®, Monel®, Hastello®C, or the like, and the end-clip fingers 116 are made of cold-rolled steel.

A suitable electrical source (not shown) supplies electrical current to the hot wire 110 via electrical leads (not shown) coupled to the end-clip fingers 116. Alternatively, the leads could be directly connected to the hot wire 110, in which case the end-clip fingers 116 would not need to be electrically conductive. Moreover, the hot wire 110 could be heated by other means, such as embedded cartridge heaters, radiation, or the like.

Enough current (or other form of energy) is supplied to the hot wire 110 to heat it to an elevated temperature at which the polyethylene film 108 will melt, but not burn. The inventors have found that heating the hot wire 110 to a temperature of about 800° F. or lower will avoid burning the polyethylene film 108, and consequently, will not cause any substantial accumulation of wax on the components of the apparatus 100. Preferably, the hot wire 110 is heated to a temperature between about 600° F. to about 800° F. Of course, those of ordinary skill in the art will understand that the effective temperature range will vary according to the type of thermoplastic film, the thickness of the film, the dwell time during which the hot wire contacts the film, and the pressure exerted on the film by the hot wire. For example, for a particular film having a given thickness, a lower-temperature hot wire will typically require a relatively longer period of contact with the film and/or a greater exertion of pressure on the film in order to sever and seal the film.

In a preferred embodiment, the hot wire 110 is approximately 0.050 inches wide by approximately 0.250 inches tall. The leading edge of the hot wire 110 that is used to sever and seal the polyethylene film 108 is rounded, having a radius of 0.025 inches. A rounded leading edge is preferred because it sufficiently concentrates the cutting force, yet does not dissipate heat to the ambient to the extent that a sharply-pointed leading edge would. By increasing the cross section of the hot wire 110 (compared to known devices) and supporting it for substantially its entire length, the hot wire 110 of the present invention is rendered considerably more durable than conventional hot wires.

One skilled in the art will appreciate that hot wires of different shapes could be employed, for example, hot wires having circular, elliptical, square, rectangular, wedge-shaped, or other profiles. Moreover, hot wires having larger or smaller cross-sectional areas could be used, provided the cross-sectional area of the hot wire is large enough to store a sufficient amount of thermal energy to sever and seal the film, yet small enough that the hot wire can be efficiently heated with a reasonable input of energy.

In a preferred embodiment, the hot wire 110 rests in a groove formed in an electrically- and thermally-insulating insert 118, preferably made of Cogetherm™ 505 mica. Alternatively, the insert 118 can be constructed of other insulating materials, such as, for example, ceramic, glass, or another form of mica. The insert 118, in turn, is fitted into a groove formed in a hot wire base member 120, preferably made of grade G7 Garolite™, a woven glass fabric which is laminated together with a silicone resin. Alternatively, the base member 120 can be made of Teflon®, hardwoods, phenolics, or high-temperature resistant plastics. The hot wire 110 can extend across the paths of both webs in the dual-lane apparatus. Between the effective cutting lengths 124 of the hot wire 110, a center cap 122 is mounted over both the hot wire 110 and the insert 118 to secure the hot wire 110 and the insert 118 to the hot wire base member 120.

The hot wire base member 120 is mounted on a hot wire superstructure 126 by screws or the like. Preferably, the hot wire superstructure 126 is constructed of aluminum or a comparable lightweight and rigid material. The end-clip fingers 116 are spring mounted at opposite ends of the hot wire superstructure 126 and can slide toward and away from one another. Thus, the end-clip fingers 116 maintain the hot wire taut regardless of expansion and contraction of the hot wire 110 caused by temperature fluctuations.

The hot wire superstructure 126 is mounted near opposite ends thereof to a pair of follower arms 128. Each follower arm 128 comprises an upper and a lower arm 164, 166, held together by shoulder bolts (not shown) and biased apart a relatively small distance by a compression spring 168. In a preferred embodiment, each spring 168, when compressed, exerts a force of about 54 lbf. Thus, the springs 168 of each cutting assembly 114 are capable of exerting a collective force of about 108 lbf.

Each lower follower arm 166 includes a cam follower 130, adapted for movement along a respective cam track 132. As the seal drum 102 rotates, the cam followers 130 move along the cam tracks 132, thereby reciprocating the cutting assemblies 114 radially inward and outward. The cam tracks 132 are designed such that each hot wire 110 is extended through a respective opening 112 in the surface of the seal drum 102 for approximately one-third of each revolution of the seal drum 102 (during which the anvil cam tracks of the cam track assembly 104 run parallel to the seal drum 102), and retracted within the interior of the seal drum 102 for the remainder of each revolution.

In the preferred embodiment shown, the cutting assemblies 114 are reciprocated using a cam arrangement. However, one skilled in the art will appreciate that other arrangements are possible. For example, a linear actuator, pneumatic or hydraulic cylinder, solenoid, or the like could be employed to reciprocate the cutting assemblies 114.

In the preferred embodiment described above, the heated cutting edge implement is a hot wire 110, preferably supported for substantially its entire effective cutting lengths 124 by an insulating material, and preferably made of a high-nickel content alloy. The heated cutting edge implement can be constructed of any heatable material, however, and need not necessarily be supported for substantially its entire length. In addition, the heated cutting edge implement can be heated either continuously or intermittently. Thus, any heated cutting edge implement that is used to sever and/or seal thermoplastic film, such as hot wires, hot knives, heating bars, and the like, falls within the broad scope of the invention.

The structure of a preferred anvil assembly 106 is explained with reference to FIGS. 5 and 6. Each anvil assembly 106 includes a pair of spring-loaded anvils 134 (one corresponding to each cutting length 124 of the hot wire 110) that contact the film 108 and clamp it against the seal drum 102. Preferably, each anvil 134 comprises a block of silicone rubber 136 having a strip of Teflon® tape 138 applied thereto. The Teflon® tape 138 helps to prevent the film 108 from adhering to the silicone rubber block 136.

Due to the combined spring force of the springs 168, each cutting assembly 114 preferably exerts a maximum force of about 108 lbf on an opposing anvil assembly 106. For this particular load, the inventors have found that a silicone rubber block having a hardness of 70 durometers is preferred. However, those skilled in the art will understand that softer or harder rubbers or other materials also could be used for the block, provided the selected material does not readily deform when subjected to the given load.

Each anvil 134 is mounted on a plate 140, preferably made of aluminum. The plate 140 is bracketed to an anvil base member 142, also preferably made of aluminum. The plate 140 is easily detachable from the anvil base member 142 to permit simple replacement of worn or damaged anvils 134. Two anvil base members 142 are mounted on an anvil superstructure 144, which is itself mounted on the cam track assembly 104 for movement thereabout.

The anvil superstructure 144 contains a number of holes 148, each of which has a slide pin 150 press-fitted or bolted therein. Each slide pin 150 extends out of the hole 148 and through a bushing 152 countersunk within a corresponding hole 146 in a respective anvil base member 142. A compression spring 154 interposed around each slide pin 150 biases the anvil superstructure 144 and the anvil base member 142 apart. In the preferred embodiment shown, four slide pins 150 and four springs 154 are used to mount each anvil base member 142, with one slide pin 150 and one spring 154 employed near each respective corner of the anvil base member 142. Motion limiters can be provided to prevent the anvil superstructure 144 and the anvil base member 142 from completely disengaging.

Additionally, tooling ball stems 156 (one or more corresponding to each anvil base member 142) are press-fitted or bolted in holes 158 in the anvil superstructure 144. Each stem 156 terminates in a tooling ball 160, which is received in a sleeve 162 located in or near the center of a respective anvil base member 142. The tooling ball 160 provides a point (or if two tooling balls are used, an axis) about which a respective anvil base member 142 can pivot. Thus, the anvil base members 142 are able to pivot independently about a respective tooling ball 160, enabling each anvil base member 142 to tilt as needed in order to clamp the film 108 firmly against the seal drum 102.

The anvil assembly springs 154 preferably are strong enough to resist the compressive force exerted by the hot wire 110 as it presses the film 108 against the anvils 134, yet are sufficiently elastic to permit the anvils 134 to properly align with the seal drum 102 during the clamping process. As noted, in a preferred embodiment, each cutting assembly 114 is capable of exerting a maximum force of about 108 lbf on an opposing anvil assembly 106. The inventors have found that anvil assembly springs 154 capable of exerting a collective force of about 112 lbf (14 lbf per spring) are satisfactory for this purpose.

The operation of the severing and sealing apparatus 100 will next be described.

A continuous folded web of, for example, polyethylene film 108, is fed to the apparatus 100 between the rotating seal drum 102 and counter-rotating anvil assemblies 106. One of the anvils 134 contacts the film 108 and clamps it firmly against the seal drum 102. Meanwhile, one of the hot wires 110 is advanced through a respective opening 112 in the surface of the seal drum 102 and contacts the film 108, thereby sandwiching the film 108 between the hot wire 110 and the opposing anvil 134. Thereafter, the hot wire 110 moves laterally in synchronization with the film 108 and the anvil 134, while the film 108 remains pinched between the hot wire 110 and the anvil 134 for a period of time sufficient to sever the film 108 and seal the resulting severed edges. This period of time is commonly referred to as the dwell time. The inventors have found that a dwell time of approximately one second, together with the exertion of about 108 lbf on the film 108 by the hot wire 110, is sufficient to sever and seal the film 108 using a hot wire 110 heated to a temperature between about 600° F. to about 800° F. The dwell time, contact pressure, and hot wire temperature may be manipulated to arrive at other combinations that will effectively sever and seal the film, but not burn it, all of which fall within the broad scope of the invention. In this regard, one of ordinary skill in the art will appreciate that the dwell time readily can be varied simply by adjusting the rotational speed of the seal drum 102 and anvil assemblies 106, and that the contact pressure can be varied by using fewer or more springs 154, 168, or by using springs having lower or higher compressive strengths.

After the film 108 is severed and sealed, the hot wire 110 is retracted within the interior of the seal drum 102 for the remainder of the drum revolution, before again being advanced through the opening 112 in the seal drum 102 to sever and seal another segment of the film 108. While the hot wire 110 is retracted within the interior of the seal drum 102, it reheats to the desired elevated temperature to make up for heat dissipated in the severing and sealing process. The resulting bags are temporarily retained on the seal drum 102 by a vacuum, before being transferred to another piece of equipment, such as, for example, a transfer drum (not shown).

One of ordinary skill in the art will appreciate that numerous variations on the particular embodiments described above are possible, and that such variations fall within the scope of the present invention. For example, the track assembly and seal drum could have any number of configurations. One possibility is to have a pair of counter-rotating tank-tread-shaped belts, carrying a plurality of hot wire assemblies and anvil assemblies, respectively. An advantage of such an embodiment is that the opposing straight sections of the tank-tread-shaped belts can be made as long as desired, thereby providing a longer dwell time without decreasing the production rate.

In another embodiment, the film could be advanced intermittently between a hot wire assembly and an anvil assembly, which do not move in the direction in which the film is fed. The hot wire assembly and anvil assembly could then close together to sandwich the film therebetween for a period of time sufficient to sever and seal the film.

The embodiments discussed above are representative of embodiments of the present invention and are provided for illustrative purposes only. They are not intended to limit the scope of the present invention. Although components, materials, configurations, temperatures, times, etc., have been shown and described, such are not limiting. Modifications and variations are contemplated within the scope of the present invention, which is intended to be limited only by the scope of the accompanying claims.

INDUSTRIAL APPLICABILITY

The apparatus and method of the present invention are suited for severing and sealing thermoplastic film in the high-speed production of plastic bags. As the film is fed through the severing and sealing apparatus, a cutting edge implement, heated to a temperature sufficient to melt but not to burn the film, contacts the film and presses it against an opposing anvil. The film remains pinched between the cutting edge implement and the anvil for a period of time sufficient to sever and seal the film.

We claim:

1. A method of severing and sealing a plurality of layers of film formed of a thermoplastic material, the method comprising the steps of:

heating a cutting edge implement to a temperature between about 600° F. and about 800° F. for severing and sealing a plurality of layers of the film, the temperature being sufficient to melt but not to burn a thermoplastic material;

feeding the plurality of layers of the film between the heated cutting edge implement and an opposing surface;

moving the heated cutting edge implement and the opposing surface relative to one another to pinch the plurality of layers of film therebetween; and thereafter, suspending any relative lateral movement between the heated cutting edge implement, the plurality of layers of the film, and the opposing surface, while relatively biasing the heated cutting edge implement and the opposing surface together with the plurality of layers of film pinched therebetween, until the cutting edge implement, heated to the temperature between about 600° F. and about 800° F., severs the plurality of layers of the film by melting but not burning the plurality of layers, contacts the opposing surface, and seals the plurality of layers of the film together.

2. A method according to claim 1, wherein the moving step comprises the step of advancing the heated cutting edge implement in a direction substantially perpendicular relative to a contact area of the opposing surface.

3. A method according to claim 1, wherein the suspending step comprises synchronously moving the heated cutting edge implement, the film, and the opposing surface in substantially the same lateral direction.

4. A method according to claim 1, wherein the heated cutting edge implement is a hot wire, and further comprising the step of, prior to the moving step, supporting the hot wire for substantially its entire effective cutting length.

5. A method according to claim 1, wherein the suspending step comprises suspending relative lateral movement between the heated cutting edge implement, the film, and the opposing surface for approximately one second.

6. A method of severing and sealing a plurality of layers of film, the method comprising the steps of:
heating a cutting edge implement to a temperature between about 600° F. and about 800° F. for severing and sealing a plurality of layers of the film, the temperature being sufficient to melt but not to burn a film;
feeding the plurality of layers of the film between the heated cutting edge implement and an opposing surface;
moving the heated cutting edge implement and the opposing surface relative to one another to pinch the plurality of layers of the film therebetween; and
relatively biasing the heated cutting edge implement and the opposing surface together with the plurality of layers of film pinched therebetween, until the cutting edge implement, heated to the temperature between about 600° F. and about 800° F., severs the plurality of layers of the film by melting but not burning the plurality of layers and seals the resulting severed edges.

7. A method according to claim 6, wherein the heated cutting edge implement is a hot wire, and further comprising the step of supporting the hot wire for substantially its entire effective cutting length.

8. A method according to claim 6, wherein the moving step comprises pinching the film between the heated cutting edge implement and the other surface for approximately one second.

9. A method of severing and sealing a plurality of layers of film formed of a thermoplastic material, the method comprising the steps of:
heating a cutting edge implement to a temperature between about 600° F. and about 800° F. for severing and sealing a plurality of layers of the film, the temperature being sufficient to melt but not to burn a thermoplastic material;
pinching the plurality of layers of the film between a substrate and the cutting edge implement that is heated to the temperature between about 600° F. and about 800° F.; and
pressing the cutting edge implement toward the substrate with the plurality of layers of the film pinched therebetween, until the cutting edge implement, heated to the temperature between about 600° F. and about 800° F., severs the plurality of layers of the film by melting but not burning the plurality of layers, contacts the substrate, and seals the plurality of layers of the film together.

10. A method according to claim 9, further comprising the step of feeding the plurality of layers of film in a lateral direction, and synchronously moving the substrate and the heated cutting edge implement in the lateral direction during the pinching and pressing steps.

11. A method according to claim 9, wherein the heated cutting edge implement is a hot wire, and further comprising the step of, prior to the pinching and pressing steps, supporting the hot wire for substantially its entire effective cutting length.

* * * * *